(12) United States Patent
Daniell

(10) Patent No.: US 7,546,535 B2
(45) Date of Patent: Jun. 9, 2009

(54) METHODS, SYSTEMS, AND COMPUTER PROGRAM PRODUCTS FOR SORTING ELECTRONIC-MAIL MESSAGES

(75) Inventor: William Daniell, Kennesaw, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 338 days.

(21) Appl. No.: 11/312,845

(22) Filed: Dec. 19, 2005

(65) Prior Publication Data

US 2007/0143420 A1 Jun. 21, 2007

(51) Int. Cl.
G06F 15/16 (2006.01)
(52) U.S. Cl. .................... 715/752; 706/45; 709/206
(58) Field of Classification Search .............. 709/206; 706/45; 715/752
See application file for complete search history.

(56) References Cited

U.S. PATENT DOCUMENTS

| | | | | |
|---|---|---|---|---|
| 6,339,795 B1 * | 1/2002 | Narurkar et al. | ........... | 709/246 |
| 6,553,358 B1 * | 4/2003 | Horvitz | ................ | 706/45 |
| 6,592,627 B1 * | 7/2003 | Agrawal et al. | ............. | 715/234 |
| 2004/0210640 A1 * | 10/2004 | Chadwick et al. | ........... | 709/207 |
| 2004/0267893 A1 * | 12/2004 | Lin | ................ | 709/207 |
| 2007/0143411 A1 * | 6/2007 | Costea et al. | ................ | 709/206 |

OTHER PUBLICATIONS

Macskassy et al. ("EmailValet: Where do you want to read your Email?" ICML-2000).*
Macskassy et al. ("EmailValet: Learning user preferences for wireless email" IJCAI 1999).*
Macskassy et al. ("Information valets for intelligent information access" AAAI Spring Symposia Series on Adaptive User Interfaces, AUI 2000).*

* cited by examiner

Primary Examiner—Albert DeCady
Assistant Examiner—Tejal Gami
(74) Attorney, Agent, or Firm—Cantor Colburn LLP

(57) ABSTRACT

Methods, systems, and computer program products for sorting e-mail. Methods include receiving an e-mail message for a user at a first mailbox. The e-mail message includes an attribute. A probability that a copy of the e-mail message belongs in a second mailbox is calculated. The calculating is based on a statistical model and the attribute of the e-mail message.

20 Claims, 3 Drawing Sheets

METHODS, SYSTEMS, AND COMPUTER PROGRAM PRODUCTS FOR SORTING ELECTRONIC-MAIL MESSAGES

BACKGROUND

Exemplary embodiments relate generally to electronic-mail (e-mail) messages, and more particularly, to methods, systems and computer program products for sorting e-mail messages into one or more mailboxes.

Application programs for providing e-mail messages are commercially available. In a typical e-mail system, each user has an incoming mailbox (or "in-box") where incoming e-mail messages are received from other users. Upon receiving one or more e-mail messages, the user scans through each of the e-mail messages and determines what action to perform. Actions may include: reading and deleting the message; reading and responding to the message, moving the message to another mailbox and copying the message to another mailbox. The user may have several mailboxes for sorting the incoming e-mail messages. Different mailboxes may be set up to store e-mails related to a specific project, from a particular user, and/or about a specific topic. Reviewing and determining how to process each e-mail message can be a time consuming process for the user. It would be desirable to be able to expedite this process.

SUMMARY

Exemplary embodiments relate to methods, systems, and computer program products for sorting e-mail. Methods include receiving an e-mail message for a user at a first mailbox. The e-mail message includes an attribute. A probability that a copy of the e-mail message belongs in a second mailbox is calculated. The calculating is based on a statistical model and the attribute of the e-mail message.

Systems for sorting e-mail include a processor and computer instructions executing on the processor for facilitating receiving an e-mail message for a user at a first mailbox. The e-mail message includes an attribute. A probability that a copy of the e-mail message belongs in a second mailbox is calculated. The calculating is based on a statistical model and the attribute of the e-mail message.

Computer program products for sorting e-mail include a storage medium readable by a processing circuit and storing instructions for execution by the processing circuit for facilitating a method. The method includes receiving an e-mail message for a user at a first mailbox. The e-mail message includes an attribute. A probability that a copy of the e-mail message belongs in a second mailbox is calculated. The calculating is based on a statistical model and the attribute of the e-mail message.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments provide sorting of incoming e-mail messages into one or more user mailboxes. The sorting is performed based on the past behavior of the user with respect to similar e-mail messages. Similarity may be based on attributes such as sender of the e-mail, subject line of the e-mail and/or content of the e-mail. In exemplary embodiments, a Bayesian model is utilized to determine the probabilities that an e-mail message belongs in one or more target mailboxes. An e-mail message is moved (or copied) automatically to a target mailbox when there is a high probability that the user would move the message to the target mailbox. In exemplary embodiments, when the probability is medium that the user would move the message to the target mailbox, the user is asked to confirm the recommended target mailbox.

Figure 1:
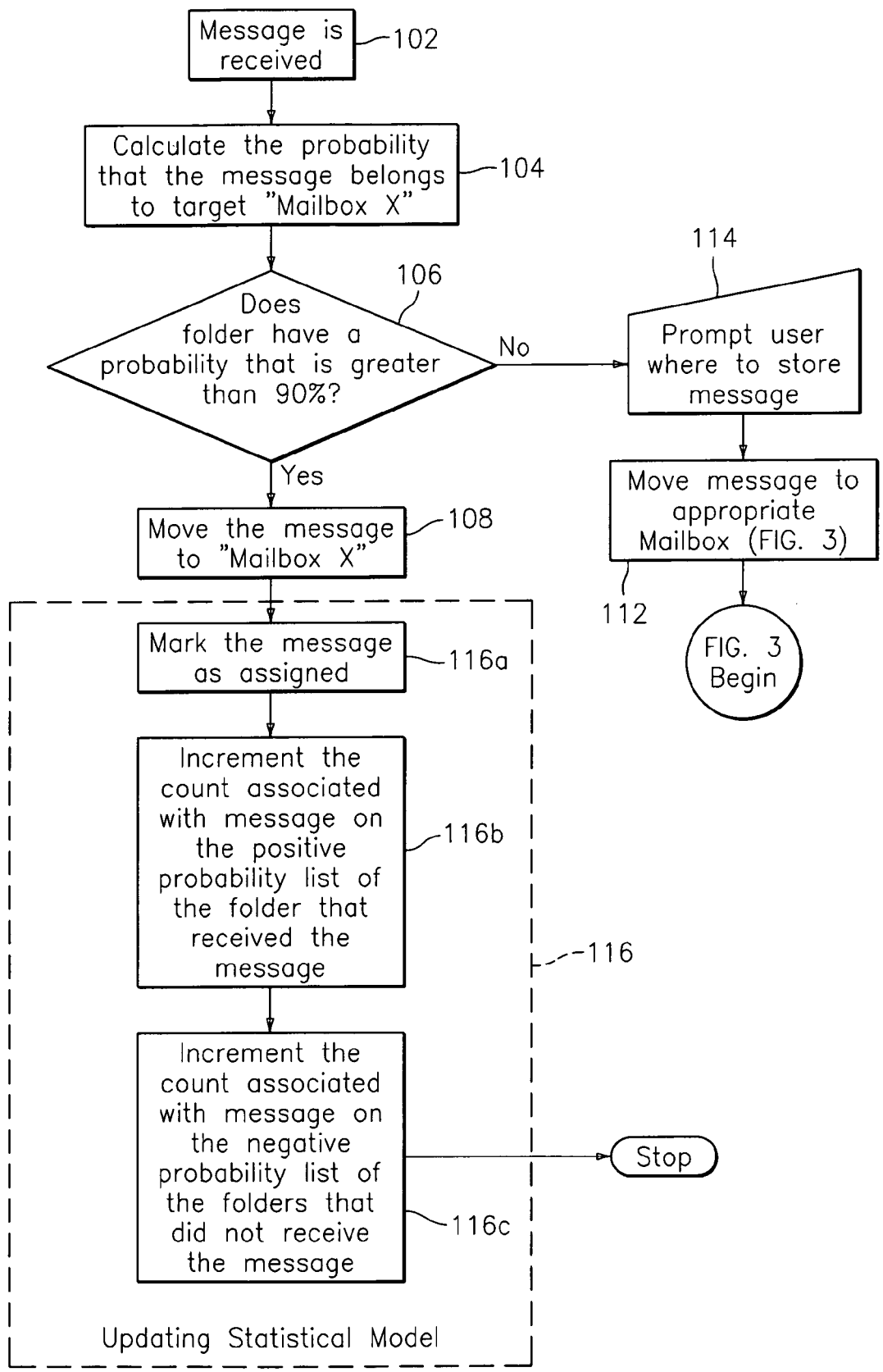
FIG. 1 is a flow diagram of an exemplary process for sorting e-mail.

FIG. 1 is a flow diagram of an exemplary process for sorting e-mail in accordance with exemplary embodiments. At block 102, an e-mail message is received by a user. At block 104, the probability that the e-mail message belongs in target mailbox "x" is calculated. In exemplary embodiments, the probability is calculated using Bayes theorem. Bayes theorem is a well known theorem that calculates the probability of an event occurring given that a related event has already occurred. Typically when using Bayes theorem, the probability of the event occurring depends on three things: the probability of the event occurring on its own, regardless of whether the related event has occurred [$P(A)$]; the probability of the related event occurring on its own, regardless of the event occurring [$P(B)$]; and the probability of the related event occurring given that the event occurred [$P(B|A)$]. A version of Bayes theorem can be stated as $P(A|B)=[P(B|A)P(A)]/[P(B)]$.

As applied to the calculating performed in block 104 of FIG. 1 the probability that the e-mail message belongs in target mailbox "x" given that the e-mail message is from sender "s" [$P(X|S)$] is equal to: [$P(S|X)P(X)$]/[$P(S)$]. $P(S|X)$ is the probability that the e-mail message is from sender "s" given that the e-mail message belongs in target mailbox "x". $P(X)$ is the probability of the e-mail message belonging in mailbox "x" regardless of who sent the e-mail message. $P(S)$ is the probability of the e-mail message being from sender "s" regardless of which mailbox it belongs in. These probabilities are calculated based on the past sorting behavior of the user of e-mail messages from sender "s" and of e-mail messages being moved (or copied) into target mailbox "x".

At block 106, it is determined if there is a high probability (in this example greater than 90%) that the e-mail message from sender "s" belongs in target mailbox "x". In exemplary embodiments, a high probability is one that is over a first threshold (e.g., ninety percent). Other implementation specific and/or user specific thresholds for a high probability may be specified for the system. In exemplary embodiments, a high probability may not be indicated by the system until the user has directed a specified number of e-mail messages from sender "s" to target mailbox "x" (i.e., until a base statistical model has been developed). If the probability is high (over a first threshold), then block 108 is performed and the e-mail message is automatically stored (e.g., moved or copied) into mailbox "x". When the e-mail message is moved, a copy no longer exists in the inbox of the user. When the e-mail message is copied a copy remains in the inbox along with the copy in the target mailbox "x". Whether an e-mail message is moved or copied may be set on an implementation wide basis or be specified by individual users. Further, e-mail messages may be moved to particular target mailboxes (or types of mailboxes) and copied to other target mailboxes (or types of mailboxes).

Processing then continues at block 116 to update the statistical model. Blocks 116a, 116b, and 116c depict an exemplary process for updating the statistical model. At block 116a, the message is marked as "assigned." At block 116b, a count associated with the message on a positive probability list of the folder that received the message is incremented in the statistical model. At block 116c, a count associated with the message on a negative probability list of folders that did not receive the message are incremented in the statistical model.

Figure 2:
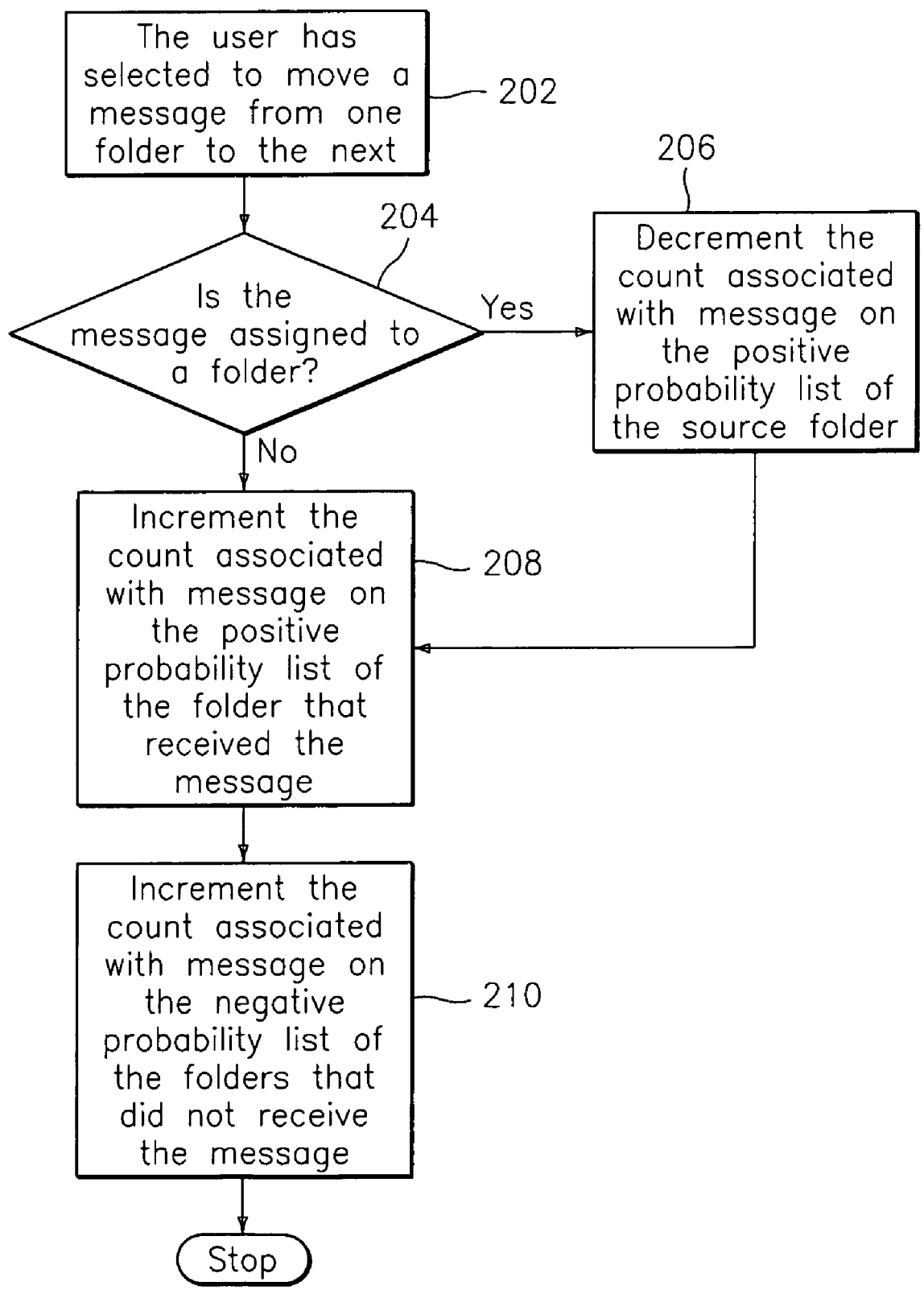
FIG. 2 is a flow diagram of an exemplary process for moving a message into a folder.

If it is determined, at block 106 in FIG. 1, that there is not a high probability that the e-mail message from sender "s" belongs in target mailbox "x", then processing continues at block 114. At block 114, the user is asked (e.g., via a pop-up screen on a user device) if the e-mail message should be stored in any other mailboxes. In exemplary embodiments, a list of current mailboxes associated with the user are displayed for the user to select from. Additionally, an indicator of whether to move or copy to each of the selected mailboxes may also be displayed for user selection. Once the instructions are received from the user, the instructions are performed by the system. The instructions from the user are input to block 112 where the message is moved to the appropriate mailbox. Processing then continues at block 202 in FIG. 2. If FIG. 2 is a flow diagram of an exemplary process for moving a message into a folder and updating the statistical model. At block 202, the user has selected to move the message from one folder to the next. At block 204, it is determined if the message has already been assigned to a folder. If the message has already been assigned to a folder, then block 206 is performed to decrement the count associated with the message on the positive probability list of the source folder (i.e., the folder where the message is currently assigned) in the statistical model. Processing then continues at block 208.

If the message has not already been assigned to a folder, as determined at block 204, then block 208 is performed. At block 208, a count associated with the message on a positive probability list of the folder that received the message is incremented in the statistical model. At block 210, a count associated with the message on a negative probability list of folders that did not receive the message are incremented in the statistical model.

The example described in reference to FIG. 1 performs the sorting based on the sender of the message. This is intended to be an example of one attribute that may be utilized to perform sorting. Any attribute of the e-mail message may be utilized to perform the sorting, either alone or in combination with other attributes. Attributes of the e-mail message that may be utilized to perform the sorting include, but are not limited to: content of the subject line; content of the message; attachments (type and content); and sender of the e-mail message. In one embodiment, the system generates tags and word counts for comparing the content of the subject line and/or the e-mail message to the content of the e-mail messages previously stored in the target mailbox. This comparison is utilized to calculate the probability in block 104. In alternate exemplary embodiments, other variations on Bayes theorem are utilized to calculate the probabilities. In further alternate embodiments, other probability models besides Bayes theorem are utilized to determine the probability that the e-mail belongs in target mailbox "x".

FIG. 1 describes determining the probability for a single target mailbox, mailbox "x". In exemplary embodiments, the probability is determined and the actions described in FIG. 1 are performed for a plurality of target mailboxes. For example, a user have may several target mailboxes including ones for e-mail messages from his supervisor, e-mail messages about a particular project, e-mail messages about a subject of interest, etc. One incoming e-mail message may be stored in none, one or more than one of the user target mailboxes. In exemplary embodiments, after the e-mail message is moved (or copied) it still appears as an unread message in the inbox of the user to indicate to the user that he has not reviewed the e-mail message. Additional messages about target mailboxes that now contain the e-mail message may also be displayed to the user. Feedback may be provided by the user reviewing these additional messages. If the user indicates that the e-mail message was sent to the wrong mailbox or that it should have been sent to additional mailboxes, then this information is input to the statistical model. Other types of feedback may also be implemented to update the statistical model. The processing depicted in FIG. 1 may be applied to both text e-mail messages and voice e-mail messages.

FIG. 1 describes a single threshold process where when the probability is high, the message is automatically moved and when the probability is high, the message is not moved automatically. In exemplary embodiments, there are two thresholds, one that represents a high probability and one that represents a medium probability. If it is determined (at block 106 in FIG. 1, that there is not a high probability that the e-mail message from sender "s" belongs in target mailbox "x") then a check is made to see if there is a medium probability that the e-mail message from sender "s" belongs in target mailbox "x". In exemplary embodiments, a medium probability is one that is higher than a second threshold, and lower than or equal to the first threshold (e.g., higher than fifty percent and equal to or less than ninety percent). Other implementation specific and/or user specific thresholds for a medium probability may be specified for the system. In exemplary embodiments, a medium probability may not be indicated by the system until the user has directed a specified number of e-mail messages from sender "s" to target mailbox "x" (i.e., until a base statistical model has been developed). If the probability is medium, then the e-mail message is stored into mailbox "x" after verifying with the user that the e-mail message belongs in mailbox "x". In exemplary embodiments, a pop-up window is displayed to the user recommending mailbox "x" but requesting a confirmation from the user. Once the confirmation is received, the e-mail message is stored in mailbox "x". Alternatively, the user may request that the e-mail message be stored in one or more other mailboxes instead of mailbox "x" or in addition to mailbox "x". The actions requested by the user are input to block 116, where the statistical model is updated.

Figure 3:
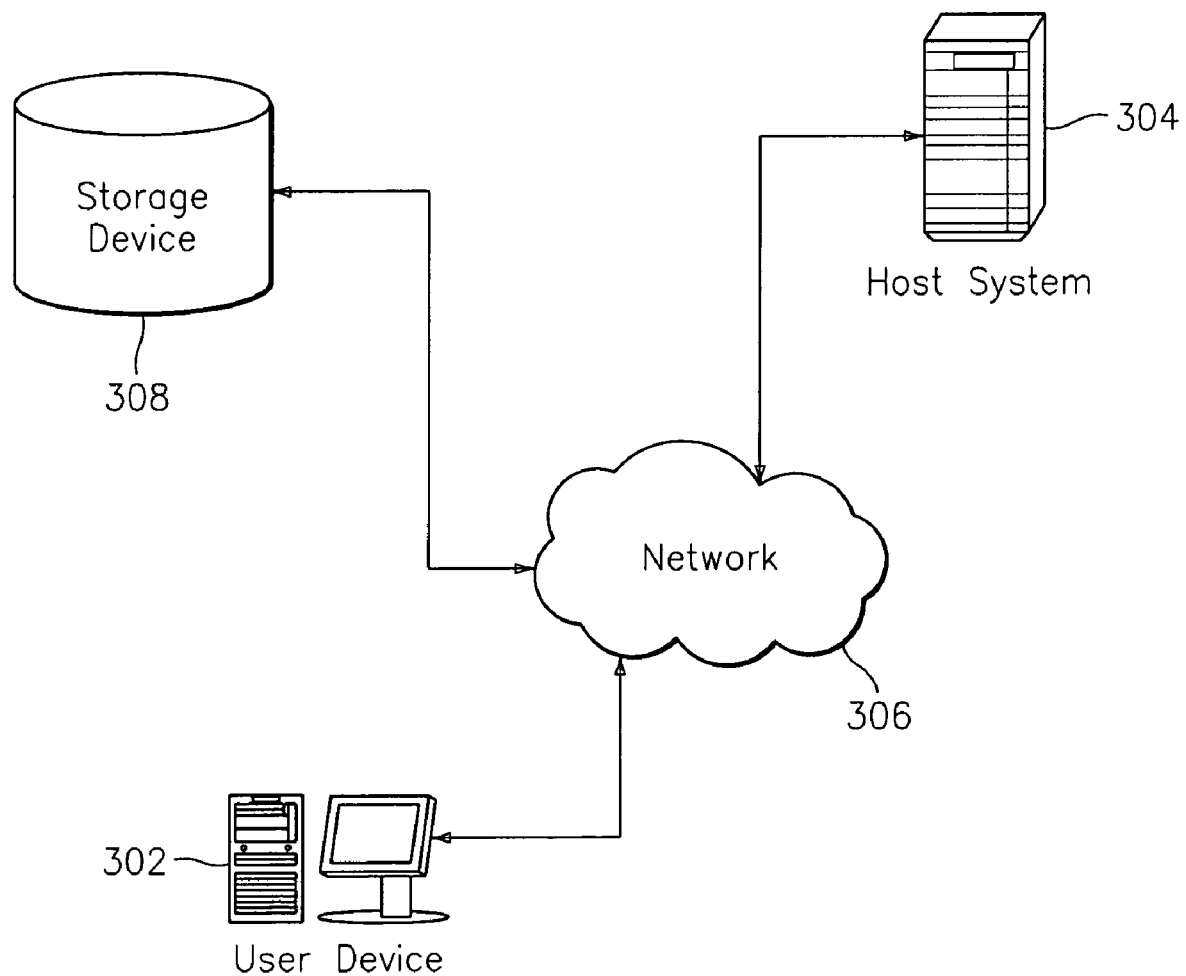
FIG. 3 is a block diagram of a system that may be utilized to sort e-mail.

FIG. 3 is a block diagram of a system that may be utilized to sort e-mail in accordance with exemplary embodiments. The system includes one or more user devices 302 through which users at one or more geographic locations may contact the host system 304 to access the e-mail sorting application (referred to herein as the "e-mail sorter"). In exemplary embodiments of the present invention, the host system 304 executes the e-mail sorter application to perform the functions described herein. The e-mail sorter may be implemented by software and/or hardware components. In alternate exemplary embodiments, the e-mail sorter described herein is built on top of an existing calendaring program or system (e.g., Microsoft Outlook).

In exemplary embodiments, the user devices 302 are coupled to the host system 304 via a network 306. Each user device 302 may be implemented using a general-purpose computer executing a computer program for carrying out the processes described herein. The user devices 302 may be personal computers, lap top computers, personal digital assistants, cellular telephones, host attached terminals, etc. with user interfaces for communicating with the e-mail sorter. The user interfaces may be implemented by interface screens, audio technology, voice recognition technology, or any other technology to allow the user to communicate with the e-mail sorter. If the user devices 302 are personal computers (or include the required functionality), the processing described herein may be shared by a user device 302 and the host system 304 (e.g., by providing an applet to the user device 302) or contained completely within one or more of the user devices 302.

The network 306 may be any type of known network including, but not limited to, a wide area network (WAN), a local area network (LAN), a global network (e.g. Internet), a virtual private network (VPN), and an intranet. The network 306 may be implemented using a wireless network or any kind of physical network implementation. A user device 302 may be coupled to the host system 304 through multiple networks (e.g., intranet and Internet) so that not all user devices 302 are coupled to the host system 304 through the same network. One or more of the user devices 302 and the host system 304 may be connected to the network 306 in a wireless fashion.

The storage device 308 may be implemented using a variety of devices for storing electronic information. It is understood that the storage device 308 may be implemented using memory contained in the host system 304 and/or the user device 302 and/or it may be a separate physical device. The storage device 308 is logically addressable as a consolidated data source across a distributed environment that includes a network 306. Information stored in the storage device 308 may be retrieved and manipulated via the host system 304. The storage device 308 includes application data such as the incoming e-mail messages, the incoming mailboxes for the users, the target mailboxes for the users, and the statistical model(s) for the users. Portions or all of the data may be located on electronic business cards such as VCards. These electronic business cards may be utilized to implement all or portions of the storage device 308. In exemplary embodiments, the host system 304 operates as a database server and coordinates access to application data including data stored on storage device 308.

The host system 304 depicted in FIG. 3 may be implemented using one or more servers operating in response to a computer program stored in a storage medium accessible by the server. The host system 304 may operate as a network server (e.g., a web server) to communicate with the user device 302. The host system 304 handles sending and receiving information to and from the user device 302 and can perform associated tasks. The host system 304 may also include a firewall to prevent unauthorized access to the host system 304 and enforce any limitations on authorized access. For instance, an administrator may have access to the entire system and have authority to modify portions of the system. A firewall may be implemented using conventional hardware and/or software.

The host system 304 may also operate as an application server. The processor in the host system 304 executes one or more computer programs to implement the e-mail sorter. Processing may be shared by the user device 302 and the host system 304 by providing an application (e.g., java applet) to the user device 302. Alternatively, the user device 302 may include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

As described above, the e-mail sorter may be utilized to automatically sort incoming e-mail messages into target mailboxes based on attributes of the incoming e-mail messages. Utilizing embodiments of the e-mail sorter may cut down on the amount of time a user spends determining where to store incoming e-mail messages.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While exemplary embodiments of the invention have been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for sorting e-mail messages, the method comprising:
   receiving an e-mail message for a user at a first mailbox, the e-mail message including an attribute;
   calculating a probability that a copy of the e-mail message belongs in a second mailbox, the calculating based on a statistical model and the attribute of the e-mail message;
   if the probability is equal to or less than ninety percent, asking the user if the e-mail message should be stored in any other mailboxes and displaying a list of the other mailboxes associated with the user;
   receiving instructions from the user to move a message to a new folder; and
   updating the statistical model in response to the moving instructions;
   wherein the updating includes:
      incrementing a count associated with the message on a positive probability list of the new folder in the statistical model, and incrementing a count associated with the message on a negative probability list of folders in the statistical model that did not receive the message.

2. The method of claim 1 further comprising storing the copy of the e-mail message in the second mailbox in response to the probability being higher than a first threshold.

3. The method of claim 2 wherein the storing the copy of the e-mail message into the second mailbox results in the e-mail message being removed from the first mailbox.

4. The method of claim 2 wherein the storing the copy of the e-mail message into the second mailbox results in the e-mail message remaining in the first mailbox.

5. The method of claim 1 further comprising:
receiving sorting instructions from the user about where to store the copy in response to the probability being equal to or less than a first threshold;
storing the copy in response to the sorting instructions; and
updating the statistical model in response to the sorting instructions.

6. The method of claim 5 further comprising requesting the sorting instructions from the user in response to the probability being equal to or less than the first threshold and higher than a second threshold, wherein the sorting instructions are received in response to the requesting, and the requesting includes verifying with the user that the copy belongs in the second mailbox.

7. The method of claim 5 wherein the sorting instructions specify storing the copy in the second mailbox.

8. The method of claim 5 wherein the second threshold is fifty percent.

9. The method of claim 5 further comprising requesting the sorting instructions for the user in response to the probability being equal to or less than the second threshold.

10. The method of claim 1 wherein the statistical model is a Bayesian model.

11. The method of claim 1 wherein input to the statistical model includes past e-mail sorting behavior by the user.

12. The method of claim 1 wherein the attribute includes one or more of a sender of the e-mail message, content of the e-mail message, and content of a subject line of the e-mail message.

13. The method of claim 1 wherein the e-mail message is a text message or a voice message.

14. The method of claim 1 further comprising
calculating a second probability that the copy of the e-mail message belongs in a third mailbox based on the statistical model and the attribute;
storing the copy of the e-mail message in the third mailbox in response to the second probability being higher than the first threshold; and
in response to the second probability being equal to or less than the first threshold:
receiving sorting instructions from the user about where to store the copy;
storing the copy in response to the sorting instructions; and
updating the statistical model in response to the sorting instructions.

15. A system for sorting e-mail messages, the system comprising:
a processor; and
computer instructions executing on the processor for facilitating:
receiving an e-mail message for a user at a first mailbox, the e-mail message including an attribute, calculating a probability that a copy of the e-mail message belongs in a second mailbox, the calculating based on a statistical model and the attribute of the e-mail message, if the probability is equal to or less than ninety percent, asking the user if the e-mail message should be stored in any other mailboxes and displaying a list of the other mailboxes associated with the user;
receiving instructions from the user to move a message to a new folder, and updating the statistical model in response to the moving instructions, wherein the updating includes:
incrementing a count associated with the message on a positive probability list of the new folder in the statistical model, and incrementing a count associated with the message on a negative probability list of folders in the statistical model that did not receive the message.

16. The system of claim 15 wherein the computer instructions further facilitate:
storing the copy of the e-mail message in the second mailbox in response to the probability being higher than a first threshold.

17. The system of claim 15 wherein the computer instructions further facilitate:
receiving sorting instructions from the user about where to store the copy in response to the probability being equal to or less than the first threshold; storing the copy in response to the sorting instructions; and
updating the statistical model in response to the sorting instructions.

18. The system of claim 17 wherein the computer instructions further facilitate requesting the sorting instructions from the user in response to the probability being equal to or less than the first threshold and higher than a second threshold, wherein the sorting instructions are received in response to the requesting, and the requesting includes verifying with the user that the copy belongs in the second mailbox.

19. The system of claim 17 wherein the computer instructions further facilitate requesting the sorting instructions for the user in response to the probability being equal to or less than the second threshold.

20. A computer program product for providing e-mail sorting, the computer program product comprising:
a storage medium readable by a processing circuit and storing instructions for execution by the processing circuit for facilitating a method comprising:
receiving an e-mail message for a user at a first mailbox, the e-mail message including an attribute;
calculating a probability that a copy of the e-mail message belongs in a second mailbox the calculating based on a statistical model and the attribute of the e-mail message;
if the probability is equal to or less than ninety percent, asking the user if the e-mail message should be stored in any other mailboxes and displaying a list of the other mailboxes associated with the user;
receiving instructions from the user to move a message to a new folder; and
updating the statistical model in response to the moving instructions;
wherein the updating includes:
incrementing a count associated with the message on a positive probability list of the new folder in the statistical model, and incrementing a count associated with the message on a negative probability list of folders in the statistical model that did not receive the message.

* * * * *